(12) United States Patent
Althen

(10) Patent No.: US 8,136,503 B2
(45) Date of Patent: Mar. 20, 2012

(54) PISTON VALVE INTERNAL COMBUSTION ENGINE

(76) Inventor: Craig Louis Althen, Whitefish, MT (US)

( * ) Notice: Subject to any disclaimer, the term of this patent is extended or adjusted under 35 U.S.C. 154(b) by 941 days.

(21) Appl. No.: 12/100,420

(22) Filed: Apr. 10, 2008

(65) Prior Publication Data

US 2009/0255507 A1  Oct. 15, 2009

(51) Int. Cl.
*F02B 53/00* (2006.01)
*F01C 1/00* (2006.01)
*F01C 1/08* (2006.01)
*F04C 18/00* (2006.01)
*F04C 2/00* (2006.01)

(52) U.S. Cl. ........ 123/221; 123/232; 123/233; 418/207; 418/195

(58) Field of Classification Search ........... 123/221, 123/232–233; 418/207, 195
See application file for complete search history.

(56) References Cited

U.S. PATENT DOCUMENTS

| | | | | |
|---|---|---|---|---|
| 1,013,121 | A | * | 1/1912 | Brooks ................ 418/207 |
| 1,618,360 | A | * | 2/1927 | Wellman, Jr. .......... 123/221 |
| 3,809,022 | A | * | 5/1974 | Dean, Jr. ............... 123/221 |
| 5,233,954 | A | * | 8/1993 | Chomyszak ........... 123/221 |
| 5,293,849 | A | * | 3/1994 | Huckert ................ 123/221 |
| 6,230,681 | B1 | * | 5/2001 | Kiseljev et al. ......... 123/221 |
| 6,273,054 | B1 | * | 8/2001 | Borisov ................ 123/221 |
| 6,546,908 | B1 | * | 4/2003 | Pekau ................. 123/206 |
| 6,901,904 | B1 | * | 6/2005 | Martin et al. .......... 123/221 |
| 7,162,993 | B2 | * | 1/2007 | Bailey et al. .......... 123/221 |
| 7,225,789 | B2 | * | 6/2007 | Martin et al. .......... 123/221 |

FOREIGN PATENT DOCUMENTS

EP    91975 A1 * 10/1983
WO   WO 9114859 A1 * 10/1991

* cited by examiner

*Primary Examiner* — Thai Ba Trieu

(57) ABSTRACT

An internal combustion engine of two perpendicular, toroidal cylinders intersecting at two junctions with each cylinder containing one piston filling half of its volume. The pistons are 180 degrees out of phase; each alternately occluding one intersection or the other. Each piston completes a full power, exhaust, intake, and compression stroke in one revolution. Endplates of 45 degrees allow the combustion chamber junction to be permanently filled and sealed at all times; first by one piston, then by the tips of both pistons as the complementary-angled endplates tangentially slide past one another, and then by the other piston. Compressed gases are shunted into the crossing cylinder's combustion chamber. Both pistons orbit continuously, one-way. Airflow is also one-way. Each piston is mounted to a sealed, 360-degree, counterbalanced ring gear. One ring gear is positioned centrally and the other peripherally to prevent interference. These maintain coordination between the pistons and provide output.

2 Claims, 7 Drawing Sheets

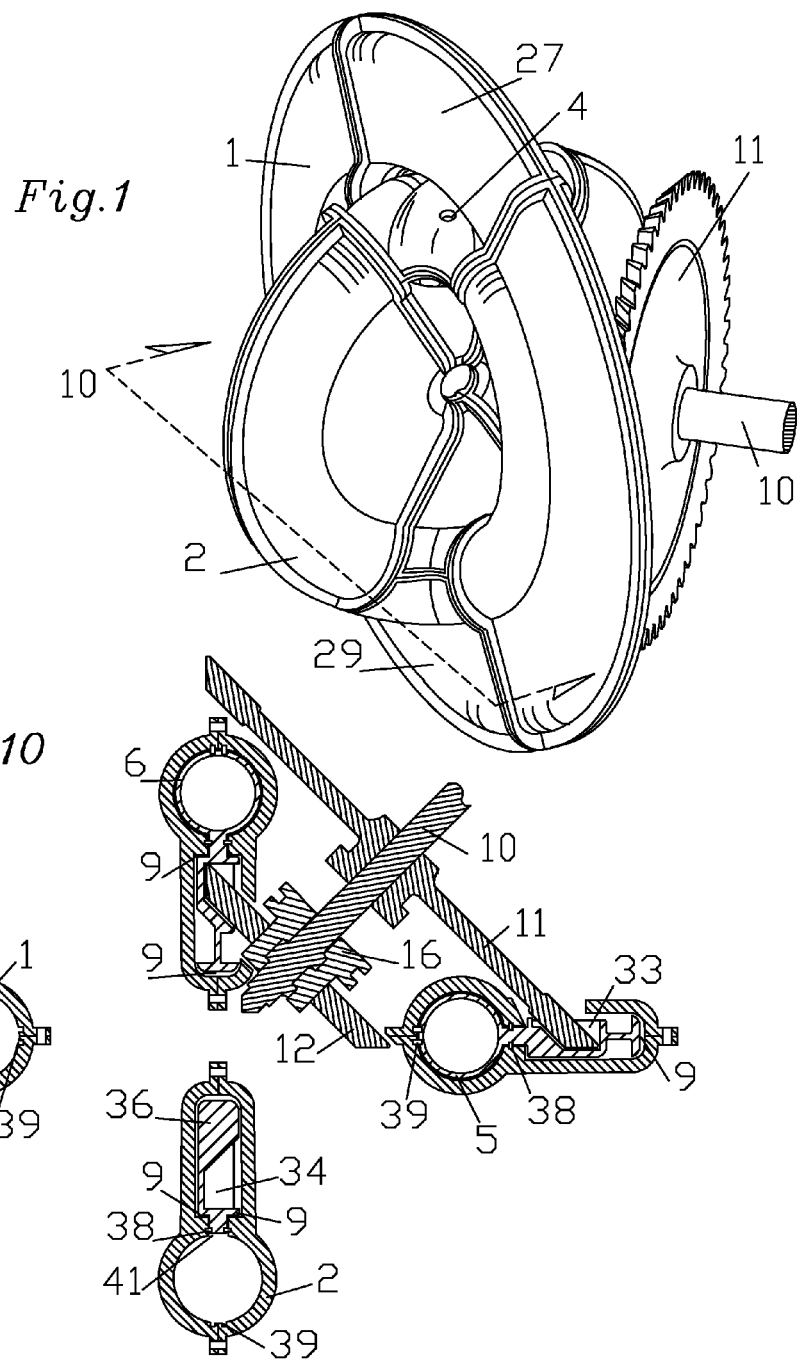

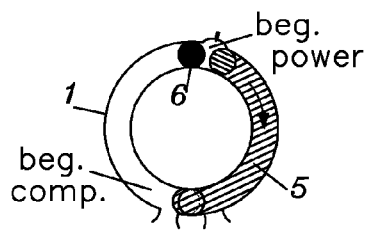
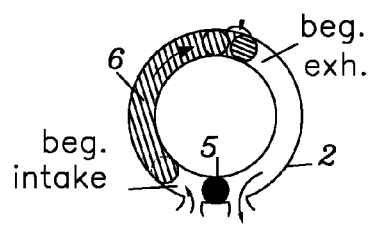
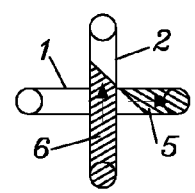
Fig.2A    Fig.2B    Fig.2C
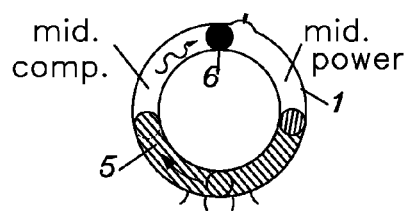
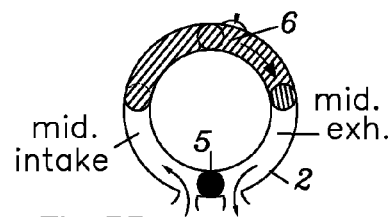
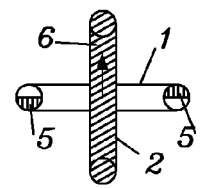
Fig.3A    Fig.3B    Fig.3C
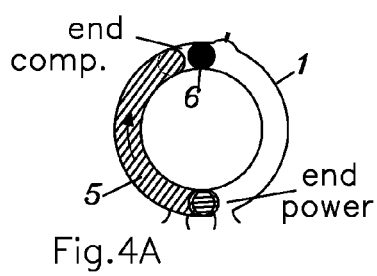
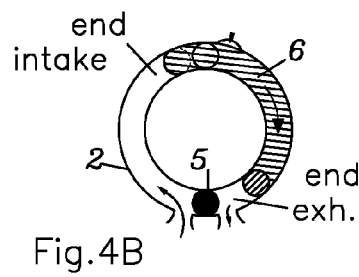
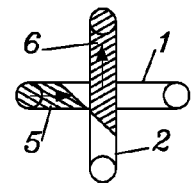
Fig.4A    Fig.4B    Fig.4C
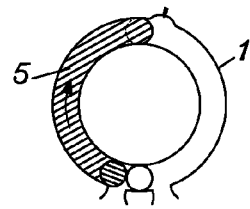
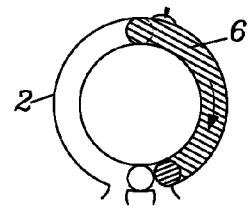
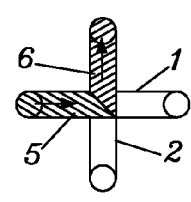
Fig.5A    Fig.5B    Fig.5C

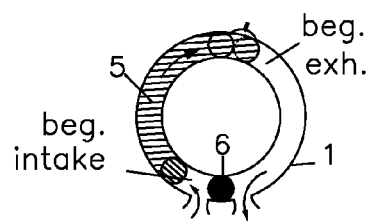 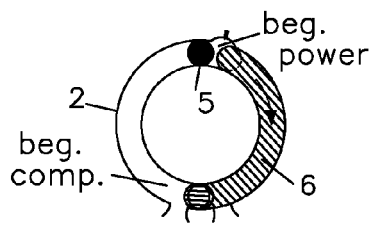 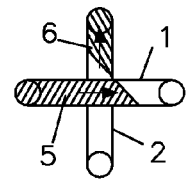
Fig.6A  Fig.6B  Fig.6C
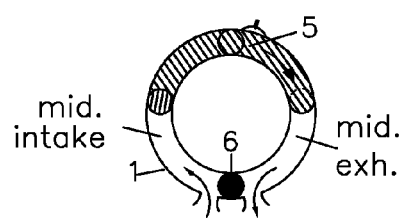 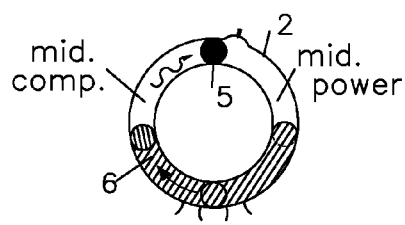 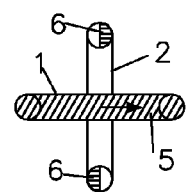
Fig.7A  Fig.7B  Fig.7C
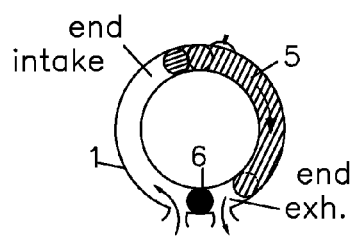 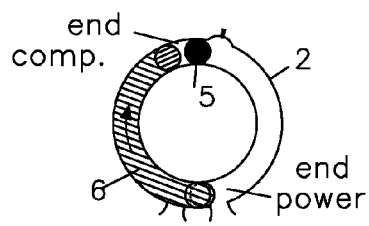 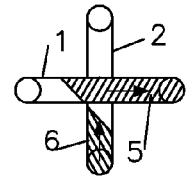
Fig.8A  Fig.8B  Fig.8C
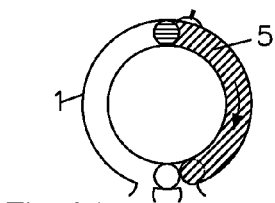 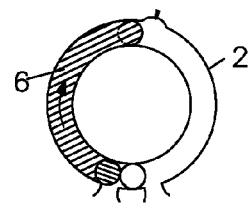 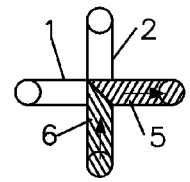
Fig.9A  Fig.9B  Fig.9C

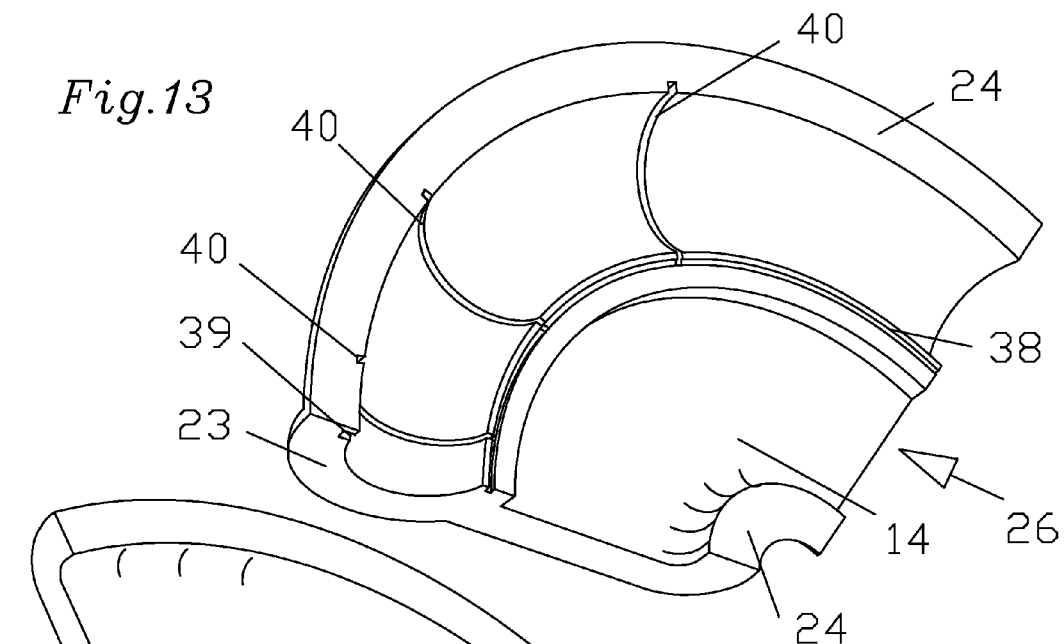
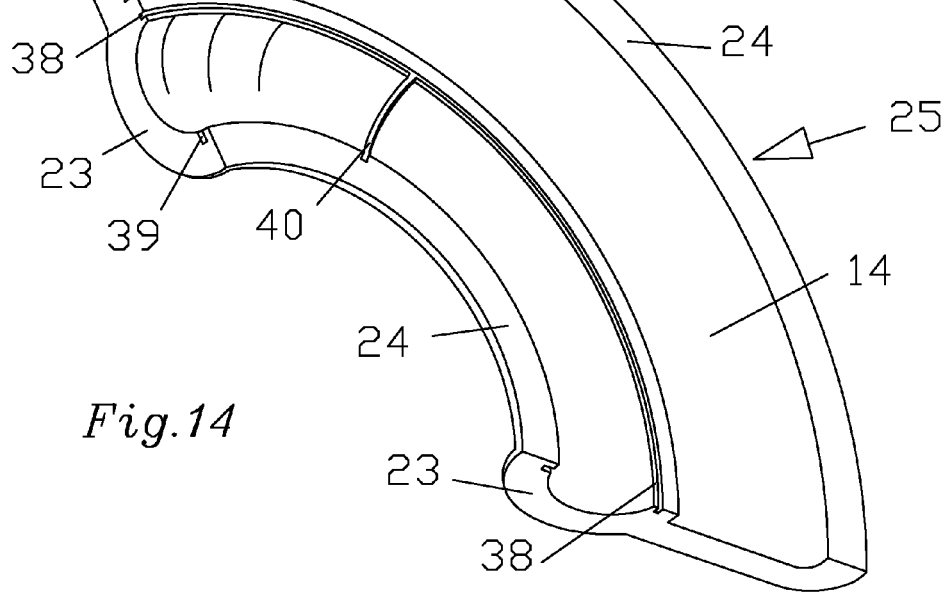

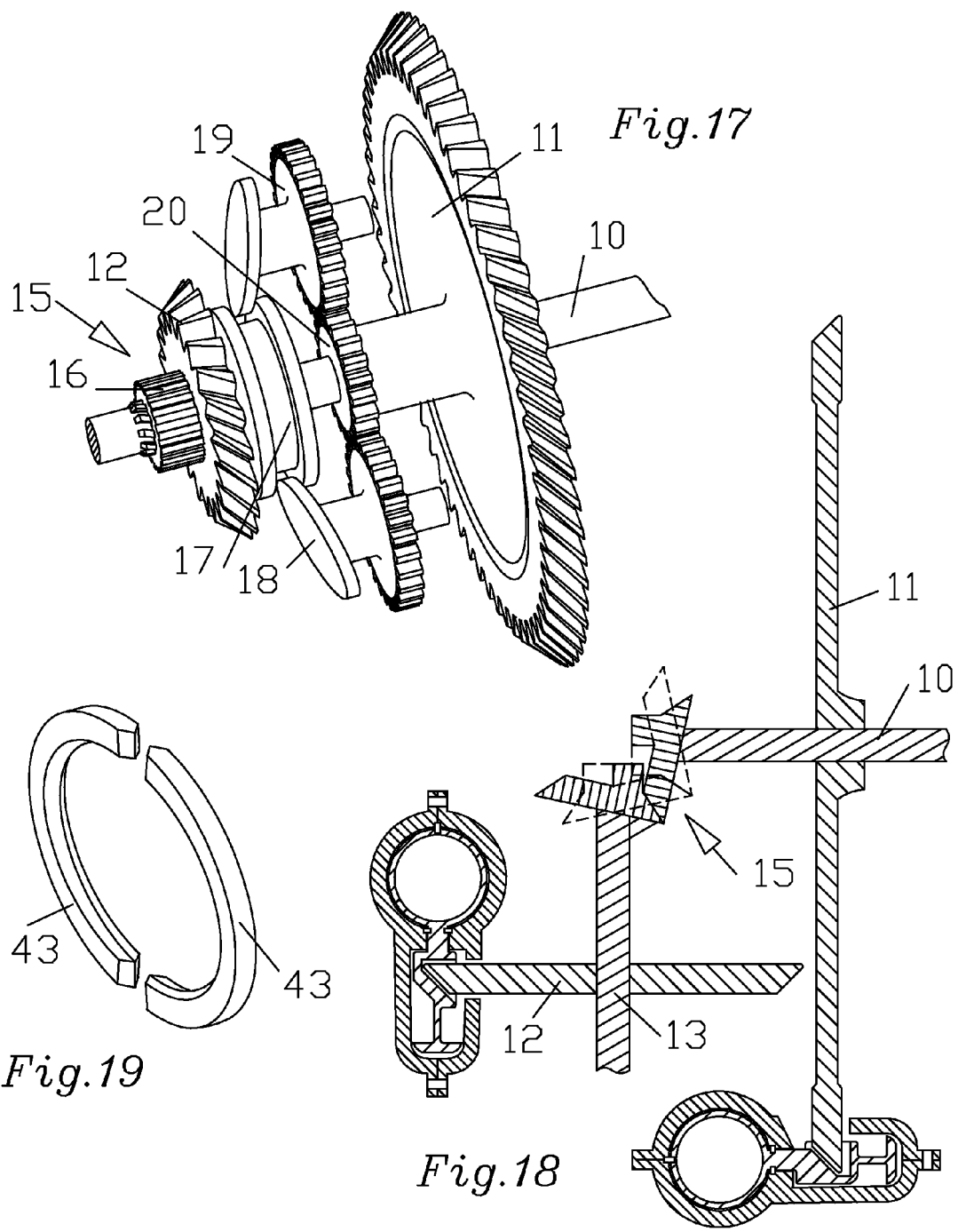

PISTON VALVE INTERNAL COMBUSTION ENGINE

BACKGROUND

1. Field of Invention

This invention relates to an internal combustion engine in which two intersecting, toroidal cylinders are oriented perpendicularly to each other so that the enclosed pistons, which rotate uni-directionally and continuously at essentially uniform speeds, can additionally function as valves during all parts of a four-stroke cycle.

2. Prior Art

The inventor is unaware of any prior art involving internal combustion engines employing either the physical layout or the topographic principles presented in this disclosure.

However, a number of individual features relate to other internal combustion engines, in particular to toroidal or toroidal cylinder engines. Toroidal engines represent a subset of rotary engines in which the pistons trace either an arc or a full circle within one or more hollow toroidal chambers, the chambers of which act as hollow, doughnut-shaped cylinders. The patent office has not yet developed a rigorous classification system for defining the various types of toroidal engines, but a number of different types are known.

In one type, the pistons move back and forth with a scissoring action, as in U.S. Pat. No. 7,182,061. A central goal of the present invention is to avoid reciprocating motions and the well-known disadvantages inherent in such motions. A second subclass includes pistons that co-rotate at different speeds within a toroid such that when they approach one another, they compress the enclosed gas between them, and then after ignition, they move apart again due to the expanding gases. A common disadvantage of this type of engine is that the piston motions are variously intermittent, and in some cases one or more pistons come to a complete stop during a cycle. An example of this type of engine is U.S. Pat. No. 6,341,590. A third subclass is represented by U.S. Pat. No. 6,546,908. This particular engine has a single toroidal cylinder and a set of rotating pistons. A rotating disk valve perpendicular to the toroid has a cutout that periodically traverses the chamber to allow the passage of the pistons. The pistons compress air against the valve while approaching, then a cutout in the valve allows the piston to pass through, and then the valve face forms a back wall of the combustion chamber immediately after the piston's passage. As pointed out in this patent, the usual problem with this type of design is that the compressed charge typically loses its pressure because the valve mechanisms are too slow at high speeds.

Unlike other toroidal engines, in the embodiment presented here, each cylinder has only one piston. Each piston rotates uni-directionally, continuously, and at an essentially uniform rate. There is no alternating advancement of the pistons or vanes, and there is no cutout valve. The compressed charge is produced in an independent cylinder (torus) for storage in the combustion chamber. As the motion of the piston about to begin its power stroke is not involved in compressing the charge, high combustion ratios can be achieved. There are a number of additional advantages unique to this particular engine. Some of these advantages are common to toroidal engines in general. However, the principal object of this invention was to overcome some of the shortcomings and inefficiencies found in conventional engines.

The efficiency of any engine can be improved in two general areas: thermal efficiency and mechanical efficiency. With regard to thermal efficiency, A. Beau de Rochas set out the four classical principles for the best working conditions in a heat engine. This is the area where the greatest losses occur in a conventional engine.

(1) Employ the largest cylinder volume and the smallest exposed surface area. This design reduces the surface-to-volume ratio at the beginning of the combustion cycle by about half compared to that of a high-compression engine of equal displacement that has a main combustion chamber with a flat to lenticular shape. The greatest heat losses occur when the temperature differences are greatest, so it is during the early part of the combustion cycle that this lower surface-to-volume ratio is most important. The advantages of this reduced surface-to-volume ratio may go beyond simple heat losses. Combustion chambers with higher surface ratios may protect a relatively greater amount of gas bound to the surface layers from complete combustion. It is likely that the combustion chamber of a piston valve engine can be configured for high efficiency because it is naturally compact, and there are plentiful opportunities for turbulent motions within the gas without concern about the stopping and reversal of the piston's motion.

(2) Maximize possible piston speed. In a conventional engine, the piston is essentially stalled out at the beginning of the power stroke beyond TDC, just at the time when the heat energy can be most readily lost. In this design, the pistons are always at full speed. Thus, the duration or period of time in which the greatest heat losses can occur is greatly reduced.

A corollary, or a second important way of looking at this principle, might be that an engine should be run at high rpm's. By limiting the time frame, this also reinforces the point of having the fuel's heat energy go into expanding the gases rather than into the cylinder walls. High rpm's become self-defeating in a reciprocating engine, but no such mechanical impediments exist in this design.

(3) Use the highest possible pressures at the beginning of the power stroke. If this engine were to be used as a diesel, it could, in principle at least, employ higher compressions because the forces are reduced for a given pressure. In a conventional engine, the forces transmitted by the connecting rod may be limiting, especially if the bore is large. This engine achieves the same amount of work using smaller forces over a longer distance. If this general design were to be used in a spark-ignition engine, the compression ratio could, again in principle at least, possibly be increased over that seen in conventional engines, because the limitations due to the induction of knocking should be reduced. The fast moving piston might allow the flame-front space to propagate without inhibition, thereby forestalling the auto-ignition of unburned end-gases.

(4) Use the greatest possible expansion. Conventional engines preferably use a relatively short stroke to limit piston wall friction and for mechanical reasons due to the linkages. More importantly, the effective stroke is further shortened because the exhaust valves typically open up well ahead of BDC in order to facilitate gas movement. This compromise is justified in terms of overall performance. The fact remains, however, that heat losses through exhaust gases represent one of the greatest losses in the whole operation of a conventional engine. In this design, there is practically no concern over the facility with which gases can be expelled because of the huge cross-sectional area of a valve-less exhaust port. A piston valve engine can clearly take advantage of this principle, and providing smooth, high rpm's while extracting more of the fuel's energy. The increase in effective stroke length can easily be 25 percent compared to a conventional engine, and possibly more.

It appears that a piston valve engine may be superior on every count.

There are possibly other advantages to the management of heat in a piston valve engine. A conventional engine uses each cylinder as an all-purpose chamber, so, for example, the cylinder walls inappropriately heat cool air during the intake cycle. In contrast, a piston valve engine largely isolates the hot and cold processes, and because of the one-way airflow, can more closely approach a steady state of thermal equilibrium. Because the intake and exhaust ports are at the opposite end from the combustion chambers, a water jacket can easily encompass and precisely control temperatures in a manner appropriate to each area, especially the combustion area.

Improving mechanical efficiency is tantamount to reducing friction. Small gains might be realized by reducing the number of moving parts. The piston valve engine eliminates camshafts, valve train mechanisms, connecting rods, and the crankshaft. In actuality, the losses due to these components are small. Nonetheless, the core of a piston valve engine is vastly simplified and its moving parts are reduced to basically three unitized assemblies: two piston assemblies and an output shaft assembly.

In a conventional engine, the biggest frictional losses by far are due to pumping air. In vehicular applications, this can even exceed the outside aerodynamic losses (Argonne National Laboratories tests, 2006). It is in the area of pumping air where the greatest mechanical efficiency gains might be found, and this is another area where a piston valve engine excels. There are no intake or exhaust valves or constricted ports. Both the intake and the exhaust ports have unrestricted, immediately direct access to the atmosphere through huge, permanent openings. The areas of the port openings can exceed the areas of the piston heads, if desired. Although the route of airflow is different from that of the pistons, the movement of the pistons and the airflow are both one-way within each cylinder, therefore both movements facilitate higher rpm's and the circulation of gases, rather than counter them.

With regard to all of the numerous, external components of the engine, such as water pumps, oil pumps, fuel pumps, air pumps, fans, alternators, belts, and so forth, these are practically identical, or exactly identical, with those found on conventional engines. Most of these items represent only a fraction of a percent of engine losses.

Another very important advantage of the piston valve engine is that it has two ignition sequences per cycle (two pistons, but each with full and complete four-stroke functionality in one revolution). Horsepower is doubled, as it is directly proportional to the firing rate. However, the increase in efficiency and the increase in power-to-size ratio go beyond this. A conventional engine of two liters displacement, or more, will typically divide this among four cylinders, or more, for smooth operation. In a piston valve engine, practically any amount of displacement can be handled with the two cylinders, and it will still operate smoothly. This also means the total surface-to-volume ratio during combustion can be improved even further, benefiting the thermodynamic efficiency. At the same time, frictional losses from pumping air are proportionately reduced.

Other features include compact size for higher displacements, high output-to-weight ratio, and the absence of a flywheel. In this design, the pistons and the output shaft also function as the flywheel. The pistons can be built relatively heavy with little or no detriment to performance because their speed and inertia are essentially constant. The whole piston assembly actually encompasses a full 360 degrees and is dynamically balanced. Subsequent sections will detail further objects and advantages. Experts will think of other advantages inherent in the overall design.

SUMMARY

The core of the piston valve engine consists of two crossed toroidal cylinders intersecting at approximately 90 degrees. Within each cylinder, a single piston fills approximately half of the cylinder's volume. Therefore, each piston has the aspect of a semi-circle. The pistons in each of the toroids, or hollow rings, handle both the power and compression strokes during half of a cycle, or 180 degrees of rotation. Each piston then completes both the intake and exhaust strokes during the final 180 degrees of revolution. Both pistons rotate uni-directionally, smoothly, and continuously, and each performs their respective tasks synchronously with the other. The pistons are always 180 degrees out of phase with each other.

Each toroid has six major, openings in its sides. Four of these openings are due to the intersections with the other toroid—two at the top (one going off to either side) and two at the bottom. The two additional openings are the intake and exhaust ports. The intake and exhaust ports are located near the intersection that is opposite to the intersection closest to the combustion chambers of each toroid. Each pair of intake and exhaust ports communicates directly with the outside air without the need for extraneous valves. Closure of all six openings is provided by the contained pistons, which also function as valves.

The dynamics of the two pistons can be briefly described as follows. If the pistons are both in a vertical orientation, then the endplates of each piston can be in very close proximity to each other. This is achieved by having the endplates of each piston oriented at 45 degrees to its long axis and at the complementary angle of the matching piston. At this point, as one piston advances further into the intersection, the other will be retreating. Because of the 45-degree angles, the parallel faces will slip past each other with a constant, very slight separation. One or more seals between the faces can remain in contact.

Starting from such a position of maximum apposition, if both pistons were to advance a distance equal to their diameters, this would be enough to move one piston into its combustion chamber and into a position ready for ignition of the fuel. The second piston, moving synchronously and perpendicular to the other, would move the same distance into the vacated intersection, thus blocking and sealing the back of the combustion chamber for the first piston. As the first piston is propelled forward by the expanding gases, its opposite end, nearly 180 degrees in advance, begins to enter the opposite side of the toroid. As it does, it soon closes off the intake port and begins to compress the gas charge in that half of the cylinder. After sealing the rear of the combustion chamber, the second piston continues to advance into the empty half of its toroid, thereby expelling its exhaust gases out the exhaust port at the far end of that cylinder section. As the piston moves forward, its opposite end, trailing by nearly 180 degrees, uncovers the intake port, and begins to draw in a new charge of gas, as it vacates that half of the toroid. The first piston is simultaneously acting as a sealing valve at the second junction for the second piston in isolating and separating its intake and exhaust ports. All four actions: intake, exhaust, power, and compression are taking place simultaneously.

When both pistons have advanced approximately 180 degrees, they are back to a mirror image of their starting positions. The first piston has finished its power stroke, and the chamber initially filled with this piston is now filled with spent fumes ready to be exhausted. The initially empty chamber on the opposite side is now filled with this piston. The gas it compressed in moving into this space has been squeezed into a side compartment of the combustion chamber of the other piston. The second piston has now completely exhausted the chamber into which it moved, and it has drawn a full charge of air into the chamber it vacated. The trailing edge of this piston is now in full apposition with the leading face of the first piston. The 45-degree, mating surfaces prevent losses of the newly compressed gases. The second piston, in moving another small distance (equal to its diameter) clears the intersection and is in a position to begin its power stroke. As it does so, the leading end of this piston will begin to compress the gas that it just drew in. This compressed gas will be transferred to the other piston, just as it received the compressed gas from the first piston. The first piston now closes the combustion chamber for the second piston, and begins to exhaust the gases it just produced. As it does so, it will simultaneously draw in a new charge of air into the half of the toroidal cylinder it is vacating. In another 180 degrees, approximately, the engine will be in its initial state.

Each piston is approximately semi-circular and essentially hollow with its endplates set at a 45-degree angle. The angles of the leading and trailing edges are set in the opposite directions, and each piston is the mirror image of the other. Each piston is rigidly attached to a counter-balanced, 360-degree ring gear to provide a full piston assembly. In one case, the piston is fixed to the outer rim, and in the other case, it is attached to the inner rim. Each toroid has a sealed slot that allows communication of the ring gears with an external output shaft. The output shaft has two bevel gears—one for each piston's ring gear. Because the ratio of the pitch circles for each assembly and its respective bevel gear is equal, they both turn the output shaft equally while forcing perfect synchrony between themselves.

BRIEF DESCRIPTION OF THE DRAWINGS

The features of the present invention, which are believed to be novel, are set forth with particularity in the appended claims. The invention, together with further objects and advantages thereof, may best be understood by reference to the following descriptions taken in conjunction with the accompanying drawings.

FIG. 1 General view of engine geometry

FIG. 2A through FIG. 9C present sequential, schematic diagrams of the engine's operation: (N.B. The outer piston is so named because of an associated ring gear around its outer perimeter—not shown in these diagrammatic figures. The inner piston has a ring gear around its inner perimeter—not shown in these diagrammatic figures. Both pistons have identical radii and curvatures, and they are neither "inner" nor "outer" with respect to each other, physically or functionally. The terminology is for convenience.)

FIG. 2A Position of the outer piston at the beginning of the power stroke and compression stroke.

FIG. 2B The sealing of the combustion chamber for the outer piston by the inner piston, and the beginning of the inner piston's exhaust stroke and intake stroke.

FIG. 2C Diagrammatic representation of relative positions of the two pistons in top view.

FIG. 3A Position of the outer piston midway through its power and compression strokes.

FIG. 3B Position of the inner piston midway through its intake and exhaust strokes.

FIG. 3C Diagrammatic representation of relative positions of the two pistons midway through their respective strokes in top view.

FIG. 4A Completion of the power and compression strokes for the outer piston.

FIG. 4B Completion of the intake and exhaust strokes for the inner piston.

FIG. 4C Diagrammatic representation of relative positions of the two pistons in top view.

FIG. 5A Transition point where the outer piston enters the junction of the toroids.

FIG. 5B Transition point where the inner piston exits the junction of the toroids.

FIG. 5C Diagrammatic representation of relative positions of the two pistons in top view.

FIG. 6A The sealing of the combustion chamber for the inner piston by the outer piston and the beginning of the outer piston's exhaust stroke and intake stroke.

FIG. 6B Position of the inner piston at the beginning of the power stroke and compression stroke.

FIG. 6C Diagrammatic representation of relative positions of the two pistons in top view.

FIG. 7A Position of the outer piston midway through its intake and exhaust strokes.

FIG. 7B Position of the inner piston midway through its power and compression strokes.

FIG. 7C Diagrammatic representation of relative positions of the two pistons midway through their respective strokes in top view.

FIG. 8A Completion of the intake and exhaust strokes for the outer piston.

FIG. 8B Completion of the power and compression strokes for the inner piston.

FIG. 8C Diagrammatic representation of relative positions of the two pistons in top view.

FIG. 9A Transition point where the outer piston exits the junction of the toroids.

FIG. 9B Transition point where the inner piston enters the junction of the toroids.

FIG. 9C Diagrammatic representation of relative positions of the two pistons in top view.

FIG. 10 Mid-cross-section of engine (as indicated in FIG. 1).

FIG. 13 Inner cylinder section.

FIG. 14 Outer cylinder section.

FIG. 17 Compact output assembly.

FIG. 18 High-speed output assembly (cross-section).

FIG. 19 Pair of diagonal rings.

NUMERICAL REFERENCES FOR FIGURES

Figure 11:
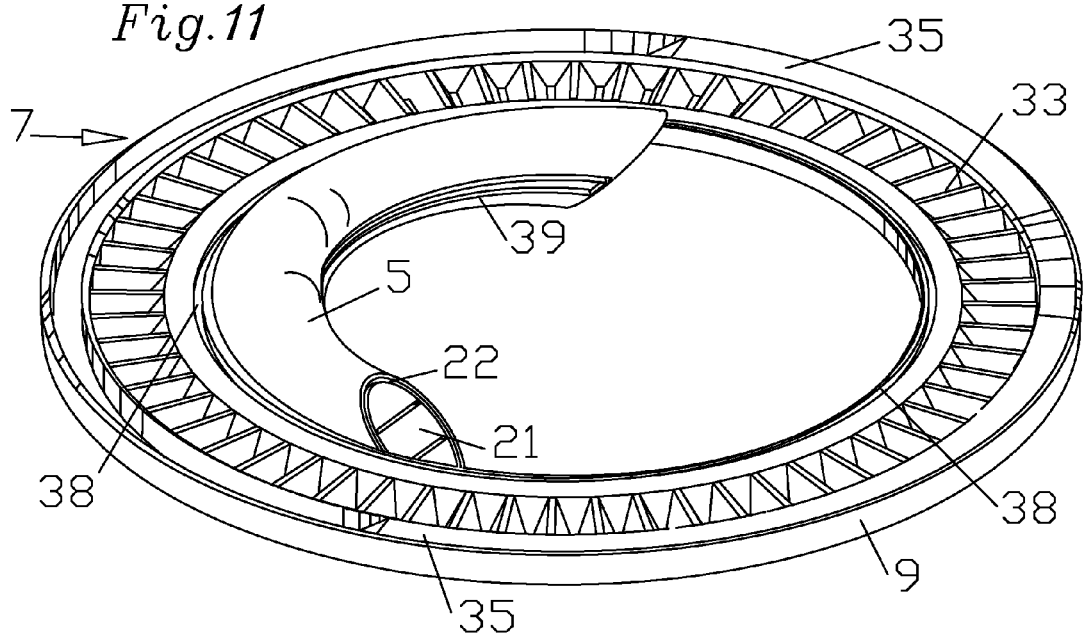
FIG. 11 Outer piston assembly.

1 Outer cylinder assembly
2 Inner cylinder assembly
3 Combustion chamber
4 Combustion chamber access port
5 Outer piston
6 Inner piston
7 Outer piston assembly
8 Inner piston assembly
9 Piston assembly bearing site
10 Output shaft
11 Outer output gear
12 Inner output gear
13 Inner output shaft
14 Ring gear chamber 15 Piston differential assembly
16 Rotator sleeve
17 Cam follower
18 Sleeve cam
19 Sleeve cam gear
20 Cam gear pinion
21 Piston endplate
22 Piston endplate ring groove
23 End flange
24 Circumferential flange
25 Outer cylinder section
26 Inner cylinder section
27 Combustion chamber junction top
28 Combustion chamber junction bottom
29 Intake-exhaust junction top
30 Intake-exhaust junction bottom
31 Intake port
32 Exhaust port
33 Outer ring gear
34 Inner ring gear
35 Outer piston counterweight
36 Inner piston counterweight
38 Longitudinal seal groove
39 Cylinder-piston seal groove
40 Cylinder ring groove
41 Cross-seal recess
42 Diagonal ring groove
43 Diagonal ring

DETAILED DESCRIPTION OF THE DRAWINGS

The figures are meant to elucidate the concept of the invention. Many of the specific dimensions and proportions are arbitrary. The design of a practical engine will require a complete revision of all dimensions and proportions.

FIG. 1 shows a general view of the engine's core and shows the geometry of the intersecting toroids. This represents only the outside of the cylinders in which the pistons are housed. For the sake of clarity and simplicity, the peripheral necessities of the engine, such as an enclosing water jacket, mounting brackets, filters, and various components of the fuel, air, and electrical systems are omitted. All components related to the cooling, lubrication, and other systems that are essential to an engine's operation, but which are conventional and well understood, have also been omitted from the figures.

Two crossed toroids, or circular cylinders, intersect with each other at approximately right angles. An outer cylinder assembly (1) is so named for an associated housing around its outer perimeter. An inner cylinder assembly (2), which is oriented perpendicular to outer cylinder assembly (1), is named for a similar housing around its inner perimeter. These housings contain gears to transmit the pistons' rotation to an output shaft (10). Internally, both cylinders have identical radii and curvatures, and they are neither "inner" nor "outer" with respect to each other, physically or functionally. These cylinders naturally intersect at two points. At one pole, combustion chambers are located internally, but this external view can only show a combustion chamber access port (4). Similar port(s) exists diagonally, but out of view, for inner cylinder assembly (2). A much clearer idea of the structure can be seen in the mid-cross-sectional view of FIG. 10 on the same page. However, as it is important to understand the engine's operation, FIG. 2A through FIG. 9C need to be reviewed first.

FIG. 2A through FIG. 9C provide a schematic and diagrammatic sequence that outlines the novel operation of the engine. The "A" figures represent sequential snapshots of the rotation of an outer piston (5), which is named for the location of its ring gear. The "B" figures represent the concomitant positions of an inner piston (6), which is named for the location of its ring gear, simultaneously rotating in a perpendicular and intersecting orbit. The "C" figures indicate a "top view" of the positions of pistons (5 & 6) relative to each other and to their respective cylinders (1 & 2) for the figures in a given row. Both pistons (5 & 6) revolve at nearly constant rates, and both encompass approximately 180 degrees of arc. A key feature is the ends of the pistons. These are oriented at approximately 45 degrees and are angled back in the radial plane of the toroid. These angles face in opposite directions at each end. Because each piston (5 or 6) subtends about half of the circumference of its cylinder, each is always occluding one of the intersections of toroids, at least partially. Each piston (5 or 6) will begin to block or close up the opposite intersection before it completely exits the intersection it is currently filling. Pistons (5 & 6) are synchronized so that the intersection located at the end where the combustion chambers occur is always completely and solidly filled. This is possible because of the complementary angles, and the fact that the speeds are identical for pistons (5 & 6) as they pass through this junction. As one piston (5 or 6) moves into the intersection, the other piston (5 or 6) slips out at exactly the same rate, and the mating surfaces of pistons (5 & 6) move past each other tangentially. Most of the time, this intersection is filled by just one of the pistons (5 or 6), and this piston thus acts as a valve or wall closing off the back of the combustion chamber. In like fashion, and at the same time, piston (5 or 6) blocking this intersection simultaneously acts as a front wall, or valve, preventing the escape of gases being compressed by the other piston (5 or 6) now approaching this same intersection.

Beginning with the "A" column, FIG. 2A shows a side view of outer piston (5) just at the start of its power stroke. The opposite piston, inner piston (6), is closing off the rear of the combustion chamber. The blockage of this intersection and, therefore, of the combustion chamber, is denoted by the solid black circle at the top of the figure. Outer piston (5) advances around the cylinder of outer cylinder assembly (1) in a clockwise direction in this view. Immediately afterwards, the distant, leading edge of outer piston (5), closes off the intake port near the opposite intersection and begins to compress the gas in the other half of outer cylinder assembly (1). In FIG. 3A, outer piston (5) is about halfway through its power stroke and its compression stroke. In FIG. 4A, outer piston (5) has rotated nearly 180 degrees and has finished both its power stroke and its compression stroke. The compressed gases have been squeezed into a side compartment of the combustion chamber of the crossing toroid. This is not visible in these diagrammatic figures. The gas has no escape route. Outer piston (5) continues to move through the combustion chamber intersection (FIG. 5A), sealing the back of the combustion chamber for inner piston (6) as shown by the solid black circle of FIG. 6B. From its position in FIG. 6A, outer piston (5) moves into the section of the toroid that it initially occupied at the beginning of the power stroke. It then expels the exhaust gases out the port at the opposite end. At the same time, outer piston (5) uncovers the intake port and begins to draw in a fresh charge of gas. The crossing, inner piston (6) isolates the intake and exhaust ports (solid circle at bottom of FIG. 6A). In FIG. 7A, outer piston (5) is about halfway through its intake and exhaust strokes. In FIG. 8A, outer piston (5) is nearing completion of these strokes. In the meantime, inner piston (6) has completed its compression stroke (FIG. 8B), so that both outer piston (5) and inner piston (6) are ready to come together again at their transitioning point, as indicated in FIG. 9A, FIG. 9B, and FIG. 9C. Immediately afterwards, the combustion chamber will be ready to fire as soon as outer piston (5) has cleared the intersection and inner piston (6) is fully blocking the intersection and sealing the back wall of the combustion chamber. The cycle has been completed and outer piston (5) has returned to its starting position of FIG. 2A.

The "B" figures portray the same actions as the "A" figures, but 180 degrees out of phase. The "C" figures provide a diagrammatic "top view" of the positions of pistons (5 & 6) relative to each other in a given row.

FIG. 10 is singularly informative as it shows the disposition of many of the external and internal components. As a mid-cross-sectional view, it shows both cylinder assemblies (1 & 2), their encased pistons (5 & 6), an outer ring gear (33), an inner ring gear (34), an outer piston counterweight (35), and an inner piston counterweight (36). It also indicates one possible arrangement of output shaft (10), and its connection to ring gears (33 & 34) by means of an outer output gear (11) and an inner output gear (12).

Several details must be amplified. First, FIG. 10 shows the output shaft (10) at a 45-degree angle, but the output gears (11 & 12) and ring gears (33 & 34) have discrete teeth, which means they can only approximate that angle (sine=0.707). Using a tooth ratio of 1:0.700 gives an angle of 45.573 degrees. Similarly, a discrete ratio of 1.4:1 gives 44.415 degrees. While it is possible to get closer to 45 degrees than these values, the constraint remains that both the inner and outer gear sets must be identical. Therefore, in the example figures of this disclosure, the tooth counts for outer ring gear (33) and inner ring gear (34) are in the ratio of 2.5:1, so the numbers are 100 and 40, respectively, and the number of teeth for outer output gear (11) and inner output gear (12) are 70 and 28, respectively.

In a small engine, the deviation of a half of a degree from 45 degrees will be too small to notice. This may not be the case in a large engine. In a large engine, output shaft (10) might be set at the exact 45.573 degrees, or to whatever value the designer has established. This deviation means inner output gear (12) and outer output gear (11) are no longer precisely co-aligned. A universal joint (or, if necessary, a constant velocity joint) can link their shafts—possibly from opposite quadrants. An alternative solution is to offset the intersecting toroids very slightly from perpendicular. This causes no concern if the deviation is slight, but from a practical point of view, junctions with severely obtuse and acute angles become more difficult to seal. However, the mating angles of the ends of pistons (5 & 6) must be precisely adjusted to maintain complementarity. For example, if the toroids intersect at 100 degrees (and 80 degrees), the endplate angles must all be 50 degrees (or 40 degrees, depending upon orientation). Additional variations and additional solutions to these issues are presented below.

Figure 12:
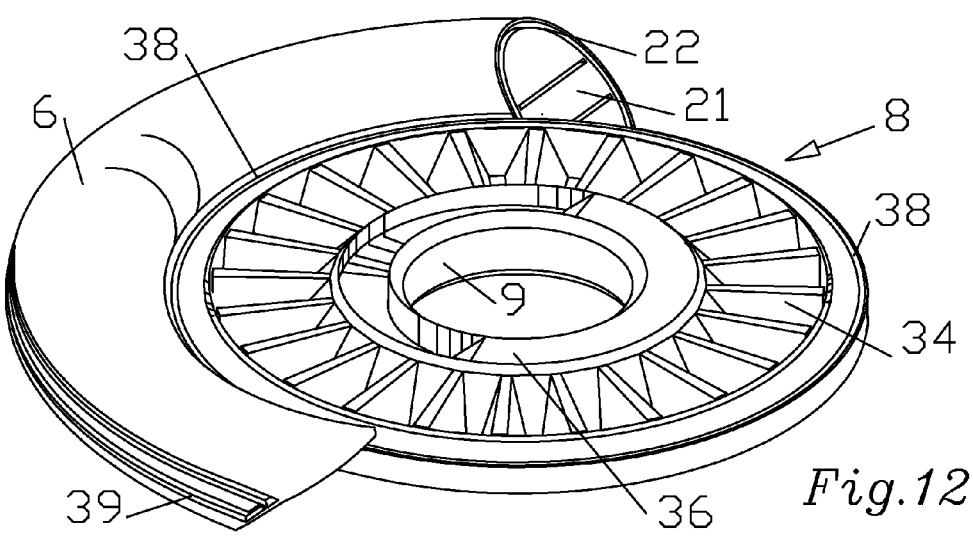
FIG. 12 Inner piston assembly.

Further details of FIG. 10 are best explained in conjunction with FIG. 11 and FIG. 12. For purposes of differentiation, seals are defined herein as aligning with the circumference of cylinder assemblies (1 & 2), and rings are defined as aligning with the circumference of pistons (5 & 6), as usual. A complex of seals can be previewed in this cross-section. Of primary importance are longitudinal seal grooves (38) situated on either side of the necks that connect pistons (5 & 6) with their respective ring gears (33 & 34). Matching longitudinal seal grooves (38) also exist directly across the gaps in the walls of cylinder assemblies (1 & 2). The simple, 360-degree seals are not drawn. Also, on the opposite sides of pistons (5 & 6) from these seals, another pair of nearly 180-degree, longitudinal seals occurs. These seals fit into paired cylinder-piston seal grooves (39) in both outer piston (5) and inner piston (6), and into directly opposite, matching cylinder-piston seal grooves (39) in the walls of outer cylinder assembly (1) and inner cylinder assembly (2), respectively. These latter grooves, of course, go around the full 360 degrees. The sealing effect is much better than that seen in the piston rings of a conventional engine, because of the opposing, matching grooves. In addition, these seals can fit much more loosely than conventional rings, because the pressure differentials will supply the force to push the sides of the seals against the walls of their retaining grooves. This applies to both sets of seals. As will be shown later, the distance between the outside edges of the paired seals in cylinder-piston seal grooves (39) must match the width of the neck attaching pistons (5 & 6) with their respective ring gears (33 & 34) to achieve a tight seal during early combustion. The two cylinder-piston seal grooves (39) could be replaced by a single, extra-wide channel and fitted with an extra-wide seal instead of the pair of seals as indicated in FIG. 10, FIG. 11, and FIG. 12. Well known methods exist for improving the quality of the simple seals presented herein, if necessary. This is the designer's prerogative.

Another detail to clarify in FIG. 10 is the presence of cross-seal recesses (41) in the piston assemblies (7 & 8). These provide clearance for the longitudinal seals in an opposing (perpendicular) piston during the time that piston is passing through an intersection. An example can best illustrate the situation. FIG. 12 shows the inner piston assembly (8). In the bottom-left corner can be seen the cylinder-piston seal grooves (39) for housing longitudinal seals. When this inner piston (6) is passing through an intersection, those longitudinal seals, which protrude above their seating grooves, need to pass under the inner edge of the outer ring gear (33) at right angles. A cross-seal recess (41) in this section of the outer ring gear (33) makes that transit possible. The floor of each of the cross-seal recesses (41) should have a profile that provides a smooth, complementary contact surface for the passing seals so that the seals continue to function properly.

Regarding bearings, the details of the size, placement, number, shape, and material are left to the ingenuity of the designers of a specific piston valve engine. Some suggestions for piston assembly bearing sites (9) are variously indicated. The suggested locations attempt to control the positioning of the piston assemblies (7 & 8) in all three axes. In addition to these, some bearings on the rear cylinder walls in the neighborhood of the combustion chamber junction are suggested. These bearings would be matched by bearing surfaces on the piston walls on the side facing away from the combustion chambers. The idea being that high pressures at the beginning of the power stroke will tend to push piston (5 or 6) blocking the rear of the combustion chamber backward, that is sideways, against its retaining cylinder. It would be best if these pressures were immediately countered. Roller-guides for pistons are known, and there are no embedded rings to interfere.

These back forces match the forces experienced by the wrist pin and the crank bearings in a conventional engine. In this engine, these forces can be spread over a relatively greater area to significantly reduce the pressures, but the speeds involved are greater, so this remains significant overall. It is probably not a question of strength, though, because pistons (5 & 6) are connected by a heavy neck for a distance of halfway around the rigid ring gears (33 & 34), so these forces can be broadly countered in any case.

As indicated in FIG. 10, pistons (5 & 6) can be hollow, but they need to be heavy enough to endure combustion chamber pressures at both ends. Unlike in a conventional engine, lightweight pistons are less important in this design because pistons (5 & 6) do not experience the extreme acceleration forces that sap an increasingly large fraction of a conventional engine's power.

FIG. 11 and FIG. 12 show outer piston assembly (7) and inner piston assembly (8), respectively. In the main, both of these assemblies are made of three important components: the pistons (5 & 6), their associated ring gears (33 & 34), and their counterweights (35 & 36) to balance the assemblies. Angled piston endplates (21) terminate each piston at each end. Note that these are at opposing angles at each end so that the leading and trailing ends of both pistons complement each other to seal the combustion chamber junction regardless of which piston (5 or 6) is about to begin its power stroke. Also note that the sealing rings, indicated by piston endplate ring grooves (22), exist at only one end of each piston (5 & 6) (or both ends of only one piston [5 or 6]). The rings must slide along the clean surface of the opposing plate—not against another set of rings. The leading edges of the rings must be shaped to allow the initial, lateral engagement of the rings with the opposing face. More sophisticated arrangements are possible—both in terms of topology and in terms of the employment of exotic materials.

There is an intrinsic feature of the topology of piston endplates (21) that necessitates a minor correction to the otherwise uniform orbital velocity of the pistons (5 & 6). Specifically, as the complementary faces abut one another at the combustion chamber junction, these faces are contrary at the opposite pole. That is, at the opposite junction (air intake junction), these same two faces are effectively facing 180 degrees away from each other, rather than matching. This means they cannot both occupy the intersection at the same time, even partially. One piston (5 or 6) must traverse the intersection, and only after it has completely exited can the other perpendicular piston (5 or 6) enter the junction to act as an isolating valve. In practice, this means that piston (5 or 6) undergoing a power stroke must move slightly faster in order to advance the equivalent of the junction's width. The junction's width equals the cylinder's bore. This difference is roughly 5 or 6 percent for half of a cycle, depending upon the compression ratio and the size and geometry of the intake and exhaust ports. Similarly, the exhausting piston (5 or 6) must be retarded the width of the cylinder's bore, so that it does not collide with the traversing piston (5 or 6) exiting the junction. To maintain the phase relationships, a piston (5 or 6) that advances or retards during the first half of a cycle must be retarded or advanced, respectively, the same amount in the second half of the cycle (orbit) to return to normal at the end of the full cycle. Mechanically, this is accomplished most readily by having one piston, the larger and heavier outer piston assembly (7) in particular, orbit at a perfectly constant rate, and have the smaller, inner piston assembly (8) vary its speed sufficiently to assure the correct geometry and correct timing for the system pair. Larger outer piston assembly (7) continues to act as a flywheel providing constant rotation and inertia, while smaller inner piston assembly (8) performs the necessary relative velocity fluctuations for both.

This subtle velocity variation can be achieved in a number of ways, and alternative approaches are presented later. In the drawings already mentioned, namely FIG. 1 and FIG. 10, outer piston assembly (7) is directly connected to output shaft (10) through outer output gear (11), and both rotate at the same, constant speed. Inner piston (6), however, advances one bore width (junction width, or about 10-11 percent) during its power and compression strokes, and it retards the same amount during its intake and exhaust strokes in the second half of its cycle. This is accomplished by the longitudinal motion of a helical-toothed spline driven through a cam arrangement referenced to the position of inner piston (6).

FIG. 17 provides more details of a piston differential assembly (15). Piston differential assembly (15) consists of a rotator sleeve (16) having the aforementioned helical teeth mated with corresponding helical teeth of output shaft (10). The rotation of output shaft (10) can be considered constant and fixed, so pushing rotator sleeve (16) longitudinally forces it to twist, therefore advancing or retarding relative to output shaft (10), depending on the direction it is moved. Rotator sleeve (16) is directly connected to an inner output gear (12) through a straight-toothed spline arrangement. Therefore, as rotator sleeve (16) advances, so does inner output gear (12), inner ring gear (34), and inner piston (6). As rotator sleeve (16) is returned to its starting position, everything is retarded by the same amount and returned to its respective starting position.

As stated earlier, the seals run longitudinally around the cylinder circumferences, and the rings surround pistons (5 & 6), as in a conventional engine. Each cylinder-piston seal, which rotates with its piston (5 or 6) within its respective cylinder-piston seal groove (39), is kept in place by the angled tabs at the very end of the seals next to the edge of the piston endplates (21). These tabs cannot have the same height as the seals because they do not have an opposing groove to run in. The tabs are primarily required to prevent gases from escaping down the channel between the seals. This is the main reason why the pair of cylinder-piston seals might be replaced by a single, extra-wide seal. The seals fitting into longitudinal seal grooves (38) can move with respect to piston assemblies (7 & 8), or to cylinder assemblies (1 & 2), or to both; this is undefined.

Cylinder ring grooves (40), depicted in FIG. 13 and FIG. 14, are for semi-circular rings, usually paired, instead of the conventional, nearly full circles. These rings could have small extensions at one end to fill the minute gap down to the main seals in longitudinal seal grooves (38), if necessary. The separations into two halves are necessary because of the two discontinuities due first to the ring gears (33 & 34) and second to the primary cylinder-piston seal(s). Though not absolutely imperative, there are several advantages that recommend placing the rings in the cylinder walls—with the proviso that the leading edges of pistons (5 & 6) be slightly tapered to slip under the rings as they orbit.

First, placing the rings in the cylinder walls reduces and fixes the sealed volumes at the rear of the combustion chambers, and those gases are prevented from being carried away or sucked away at the rear of the combustion chamber by the perpendicularly moving rings.

Second, unlike in a conventional engine, the cylinder walls need not have a high finish to reduce friction from pistons (5 & 6). The entire piston assemblies (7 & 8) can be positioned precisely and securely by a system of strategically placed bearings. The exact location of these bearing is not rigorously specified in the figures, as infinite options exist. Ultimately, the arrangements will be a function of the size and application(s) of a particular engine. In consequence, pistons (5 & 6) themselves need scarcely touch the main cylinder walls. This is true regardless of speed, as the centrifugal forces remain balanced and the pitch circle of the ring gears (33 & 34) can be carefully aligned to assure that no significant twisting torques are applied.

Third, the contact surface upon which the rings bear must be highly polished, and this is more easily achieved with pistons (5 & 6) than with cylinder assemblies (1 & 2).

Fourth, placing the rings in the cylinder walls relaxes the manufacturing tolerances when mating the multiple sections of the toroids. Fortunately all of the seals and rings work against constant, orthogonal surfaces (unlike in some rotary engines).

FIG. 13 shows an inner cylinder section (26). Three of the four sections are identical except for the placement and number of cylinder ring grooves (40). One of the four sections must have an opening in a ring gear chamber (14) to allow engagement between inner output gear (12) and inner ring gear (34). (Preferably, the opening should be in the air intake/compression arm.) The details of the size, placement, and number of supplemental rings are the prerogative of the designers of a specific engine—just as with the seals. It is suggested that the combustion/exhaust chamber have a series of rings, especially at the high-pressure end (as in FIG. 13), and that the air intake/compression chamber needs only a small number of rings—again concentrated at the high-pressure end (as in FIG. 14). All chambers require rings at both ends—inside the junction tops and bottoms. End flanges (23) and circumferential flanges (24) are also clearly shown in FIG. 13 and FIG. 14. The numerous bolt holes that perforate flanges (23 & 24) to enable assembly are not shown.

FIG. 14 shows the equivalent piece for an outer cylinder section (25). Four sections essentially identical to this one make up the main walls of outer cylinder assembly (1). One of the four sections must have an opening to allow engagement between outer output gear (11) and outer ring gear (33) in ring gear chamber (14). At one pole, a combustion chamber junction top (27) (FIG. 1) and a combustion chamber junction bottom (28) (FIG. 15), which also come in pairs, connect the four sections. At the opposite pole, an intake-exhaust junction top (29) (FIG. 1) and an intake-exhaust junction bottom (30) (FIG. 16) complete the connections and the structure. It is possible to unitize these pieces and the junction pieces to varying extents.

Figure 15:
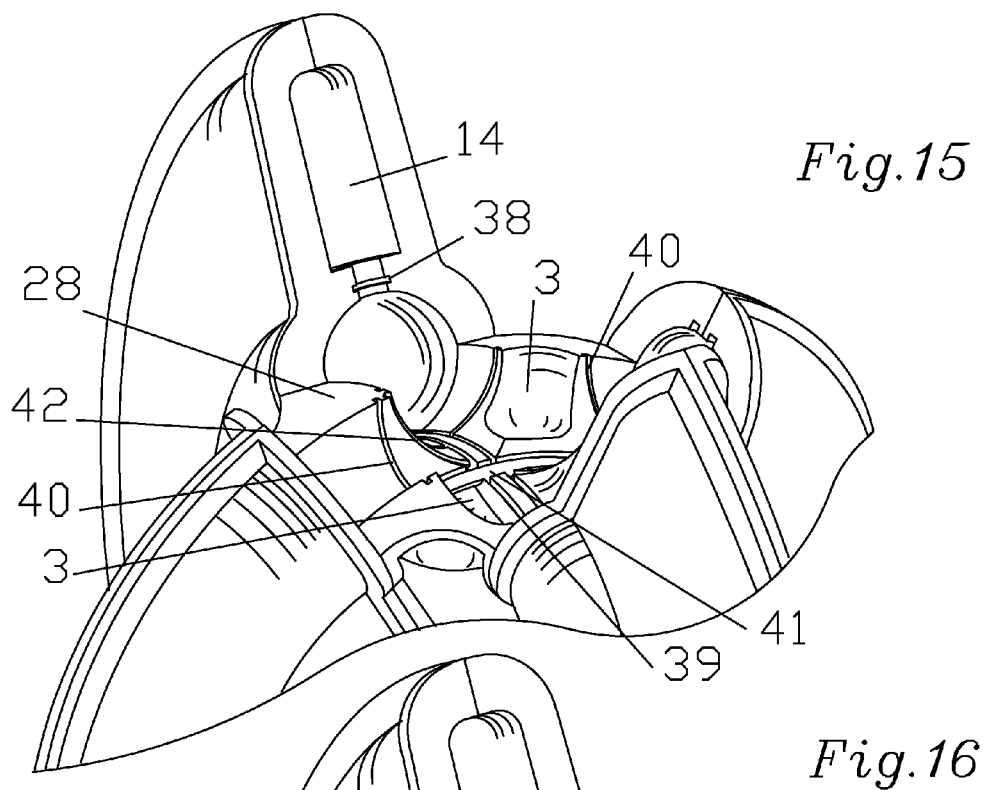
FIG. 15 View with combustion chamber junction tops removed.

FIG. 15 shows the intersection/pole with a pair of combustion chamber junction bottoms (28) exposed and a pair of combustion chamber junction tops (27) removed (see FIG. 1). The outer piston assembly (7) has also been removed. Of primary importance is a pair of combustion chambers (3), for which the bottom halves are shown in FIG. 15. The top halves of combustion chambers (3) are presumed to be approximately symmetrical. Perhaps these should be called pre-combustion chambers, because they represent the storage spaces for the compressed gases before the full chamber is formed by the sealing off of the back wall by the occluding piston (5 or 6) and the addition of the diagonal space provided by the piston (5 or 6) about to begin its power stroke (refer to FIGS. 2C & FIG. 6C). As in a conventional engine, ignition will have to advance with increasing rpm's. It may be that, at high speeds, ignition can begin before the piston endplates (21) have completely finished slipping past one another to form a complete chamber. Because of a diagonal ring (43) (see description below and FIG. 19), the chamber is sealed at all times. Moreover, piston (5 & 6) motions are presumed to become so fast that the inertia of the gases will limit any noticeable escape of the gases within the time frame of interest. It is noteworthy that, topologically, the volume of the intersecting junction itself, at the combustion chamber end, is permanently, completely, and solidly filled at all times. The actual size and shape of (pre) combustion chambers (3) is the prerogative of the designer.

Another issue with combustion chamber (3) and the angled piston endplates (21) of pistons (5 & 6) is that gas needs to surround the entire end so that the pressure acts to push piston (5 or 6) down its cylinder and not against the cylinder sidewalls. If the seals and rings are large and the gaps between the cylinder walls and the pistons (5 & 6) are generous, this will not be an issue. But as there are advantages to minimizing this clearance, it might be necessary to correct any problems in this regard. One easy solution may be to have small extensions, or a girdling channel, from the combustion chamber (3) around to the far side, so that the pressures are, largely, if not completely, equalized. This concern might also be ameliorated by the placement of strategic bearings.

Figure 16:
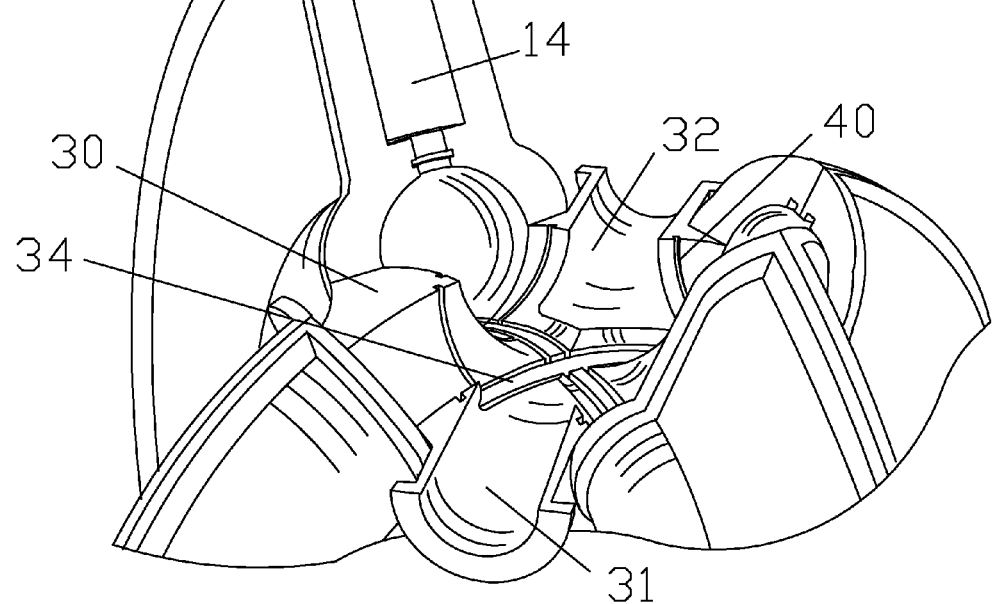
FIG. 16 View with intake-exhaust junction tops removed.

FIG. 16 shows the opposite pole with a pair of intake-exhaust junction bottoms (30) exposed and a pair of intake-exhaust junction tops (29) removed (see FIG. 1) and outer piston assembly (7) removed. The numerical references in FIG. 16 have already been discussed, except for an intake port (31) and an exhaust port (32). Note that both intake port (31) and exhaust port (32) are invisible in FIG. 1 because these are oriented diagonally to the quadrants containing combustion chambers (3). These quadrants maximize the period of air intake, exhaustion, compression, and expansion. Each of these actions is influenced by the orientation of the angle of piston endplates (21) in conjunction with the side of the chambers on which the openings are located. It is possible to have individual and independent ports on the outside circumference of the inner toroid and separate port openings on the inside circumference of the outer toroid. Note that during the construction of the engine, intake-exhaust junction bottoms (30) and combustion chamber junction bottoms (28) are the best pieces to initially fit around the piston assemblies (7 & 8).

FIG. 17 shows the compact arrangement of the output gears (11 & 12) as presented in FIG. 1 and FIG. 10. In particular, FIG. 17 shows a sleeve cam gear (19), which is oriented vertically because of space considerations, and therefore does not show up in FIG. 10. Details of the rims of a sleeve cam (18) and of the groove of a cam follower (17) are not included in the figure. Further details might include a sphere, slidable on the cam's rims, about which could be fixed a cube that would be capable of pivoting in all necessary directions. The cube could then be in permanent, surface-contact within the groove of cam followers (17)—instead of a simple rim in point-contact.

As mentioned earlier the tooth count for all of the gears must be consistent to maintain the phase relationships between both pistons (5 & 6). This means that a cam gear pinion (20) mounted on output shaft (10) has 14 teeth, and each sleeve cam gear (19) has 20 teeth. Thus, the ratios are consistent and piston differential assembly (15) has a reciprocal gear ratio. This causes the motions of rotator sleeve (16) to be in one-to-one correspondence with the motion of inner piston (6) it is controlling. This mechanism will naturally produce the essentially equal speeds for both pistons (5 & 6) that are necessary during the transition periods (FIG. 5C & FIG. 9C). If any error were evident, the sleeve cams (18) could be subtly adjusted to achieve perfect speed control.

Other orientations of the engine besides that depicted in FIG. 1 are possible. Several other arrangements are more stable, including putting the heavier-walled combustion chamber junction at the base, or the entire engine on its side. Neither of these options alters the orientation of output shaft (10).

No piston differential assembly (15) is necessary if a practical means to switch the angle of piston endplates (21) during each half cycle is employed. Piston endplates (21) would then be compatible at both junctions, allowing a perfectly uniform speed throughout. Although a running cam groove might accomplish such a change on a vertically pivoting piston endplate (21), the basic geometry, speeds, and internal environment of the engine make this attractive possibility impossible to recommend.

FIG. 18 shows a simplified cross-section similar to FIG. 10, but this figure shows an alternative to the spiral-sleeve mechanism used as a piston differential assembly (15) in the earlier figures. FIG. 18 represents an embodiment especially tailored for applications where very high rpm's are desired. In FIG. 17, some reciprocating motion still exists due to the action of sleeve cams (18) on rotator sleeve (16) and its cam follower (17). This configuration effectively eliminates that reciprocating motion, and it simplifies piston differential assembly (15). In this case, the mechanism is replaced by a pair of matched, sub-circular, bevel gears. Each of these gears is counterbalanced to rotate smoothly. The tilt and the variation in the radii are exaggerated in FIG. 18 to more clearly show the concept. An inner output shaft (13) is required. This arrangement also obviates the need to keep the tooth count between the gears to a simple ratio because all of the gear pairs are set to a straight 1:1 ratio throughout. The effectiveness of the larger, outer output gear (11) as a flywheel is more pronounced. The main sacrifice is compactness. However, to the extent the usual, external accessories for the fuel, air, and electrical systems could be repositioned into the interior, this shortcoming would be nullified.

For the record, the arrangement in FIG. 18 might be modified to eliminate inner output gear (12) and have inner output shaft (13) come directly, and perpendicularly, from the center of a revised, inner piston assembly. A much lighter bevel gear set and piston assembly would result. However, because this would produce a structurally weaker cylinder assembly, it is not presented.

FIG. 19 shows another output configuration. In both of the preceding configurations, outer output gear (11) rotates uniformly in conjunction with output shaft (10), while inner output gear (12) and its associated inner piston assembly (8) subtly varies its speed somewhat during a complete revolution. By inserting a differential gear directly into the output stream, output shaft (10) can rotate perfectly uniformly, while both piston assemblies (7 & 8) subtly vary. For example, perhaps in the former cases, inner piston assembly (8) varied by 11 percent and outer piston assembly (7) did not vary at all. In this arrangement, even though the moment of inertia is much higher for outer piston assembly (7), it can accept a couple of percentage points of speed variation, and inner piston assembly (8) can accept the remaining, fixed, built in difference—proportional to its energy. The workload is split. Output shaft (10) is assumed to be connected to a very high inertial load. The asymmetries of the 1:1 compound gear set making up piston differential assembly (15) is again exaggerated to show the concept.

FIG. 19 shows a perspective view of a pair of diagonal rings (43) that fit into diagonal ring grooves (42) shown in FIG. 15. Unlike the other rings, diagonal rings (43) are illustrated because of their importance in preventing the escape of pressurized gases during the earliest stages of the combustion cycle and especially because of their non-conventional shape. Each diagonal ring (43) has the shape of a semi-ellipse, even though each looks semi-circular in FIG. 19. The inside perimeter has two faces, one each for the two right-angled piston walls that it seals. Towards the middle of the arcs, the faces form a right angle. However, as the faces wrap around their respective piston walls, the surfaces twist to maintain full contact. By the time the ends have reached near the top and bottom of the piston walls, the angles are very obtuse. The angles would go to flat except that the ends stop short of true quadrature. This shortfall is due to the width of the neck of piston assemblies (7 & 8), and this is the reason why the spacing between the outside edges of the cylinder-piston seals is identical. Regardless of which piston (5 or 6) is passing on either axis, the ring arcs will wrap around until the ends abut (i.e., reach minutely close) against both the cylinder-piston seals and against the neck of piston assembly (7 or 8). During the period of transition between the positions shown in FIG. 4C and FIG. 6C, the walls of both pistons (5 & 6) are simultaneously engaged by the faces of one diagonal ring (43). This occurs initially with only one of the pair, then, after the transition's switchover point (exactly at FIG. 5C), by the other. The same situation occurs between FIG. 8C and FIG. 2C (switchover at FIG. 9C). Although all of the seals are constantly engaged, diagonal rings (43) are the only rings constantly engaged. This is because the junction in which they reside is always filled. The faces of diagonal rings (43) in contact with pistons (5 & 6) are constantly alternating.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. An internal combustion engine comprising:
  a first toroidal cylinder;
  a second intersecting toroidal cylinder of equal internal dimensions,
  a first rotatable piston assembly housed in said first toroidal cylinder;
  a second rotatable piston assembly housed in said second intersecting toroidal cylinder;
  at least one combustion chamber; and
  an output shaft;
   (a) wherein said first rotatable piston assembly further comprises:
     a first semi-circular piston affixed parallel inside an outer ring gear having a diameter; and
     said second rotatable piston assembly comprising a second semi-circular piston affixed parallel outside an inner ring gear having a diameter being smaller than the diameter of the outer ring gear,
     said outer ring gear being affixed to said first piston through a continuous sealed gap around an outer circumference of said first toroidal cylinder, and
     said inner ring gear being affixed to said second piston through a continuous sealed gap around an inner circumference of said second toroidal cylinder to isolate said first rotatable piston assembly;
   (b) wherein said intersecting toroidal cylinder further comprises a first intersecting junction and a second intersecting junction;
     wherein second intersecting junction said is 180 degrees opposite said first intersecting junction,
     wherein first intersecting junction said includes:
       at least one intake port positioned in said first toroidal cylinder and said second toroidal cylinder, and being opposingly disposed within said first intersecting junction, and
       at least one exhaust port positioned in said first toroidal cylinder and said second toroidal cylinder;
   (c) wherein said at least one combustion chamber is in common with said first toroidal cylinder and said second toroidal cylinder, and opposingly disposed within said second intersecting junction;
   (d) wherein said first semi-circular piston includes end plates slanted at approximately 45 degrees at each end, and wherein said second semi-circular piston includes end plates slanted at approximately 45 degrees at each end oriented in a complementary fashion to permit partial inclusion of said first semi-circular piston and partial inclusion of said second semi-circular piston within said second intersecting junction simultaneously; and (e) wherein said outer ring gear and said inner ring gear are mutually connected to each other through a differential gear train having a variable gear ratio to coordinate timing in said first rotatable piston assembly and said second piston assembly, and wherein said gear train is connected to said output shaft.

2. The internal combustion engine as set forth in claim 1, further comprising a plurality of longitudinal seals in said first toroidal cylinder and said second toroidal cylinder, a plurality of transverse rings in said first toroidal cylinder and said second toroidal cylinder, and a pair of semi-elliptical rings situated diagonally in said second intersecting junction associated with said at least one combustion chamber are to prevent gas leakage.

* * * * *